United States Patent
Perea Ramos et al.

(10) Patent No.: US 11,853,790 B2
(45) Date of Patent: *Dec. 26, 2023

(54) EXPRESSION ENGINE FOR TESTING TRANSACTION PROCESSING SYSTEM

(71) Applicant: Goldman Sachs & Co. LLC, New York, NY (US)

(72) Inventors: Jorge Luis Perea Ramos, London (GB); Anton Mihailov Todorov, London (GB)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,033

(22) Filed: Jun. 30, 2022

(65) Prior Publication Data

US 2023/0036672 A1 Feb. 2, 2023

Related U.S. Application Data

(63) Continuation of application No. 17/390,350, filed on Jul. 30, 2021, now Pat. No. 11,379,258.

(51) Int. Cl.
*G06F 9/54* (2006.01)
*G06F 9/46* (2006.01)

(52) U.S. Cl.
CPC .............. *G06F 9/466* (2013.01); *G06F 9/542* (2013.01)

(58) Field of Classification Search
CPC ..... G06F 9/541; G06F 16/1837; H04L 9/0637
USPC ....................................................... 719/328
See application file for complete search history.

(56) References Cited

U.S. PATENT DOCUMENTS

| | | |
|---|---|---|
| 7,020,697 B1 | 3/2006 | Goodman et al. |
| 7,526,681 B2 | 4/2009 | Anafi et al. |
| 8,438,281 B2 * | 5/2013 | Albert ..................... H04L 43/04 709/224 |
| 8,639,983 B1 | 1/2014 | Desai et al. |
| 8,997,091 B1 | 3/2015 | Watson et al. |
| 9,229,846 B1 | 1/2016 | Budhai et al. |
| 9,292,822 B2 | 3/2016 | Hankins et al. |
| 10,289,539 B1 | 5/2019 | Arguelles et al. |
| 10,747,658 B2 | 8/2020 | Raghupathy et al. |
| 11,257,070 B2 | 2/2022 | Sewell et al. |

(Continued)

OTHER PUBLICATIONS

PCT International Search Report and Written Opinion, PCT Application No. PCT/IB2020/060631, dated Apr. 26, 2021, seven pages.

(Continued)

*Primary Examiner* — Andy Ho
(74) *Attorney, Agent, or Firm* — Fenwick & West LLP (57) ABSTRACT

A system receives a request to process data. The system uses an expression engine to apply one or more expressions to the data to perform one or more application programming interface (API) interactions, which may include one or more of: dynamic resolution of API endpoints, API payload construction, and validation of API payload data fields. The Expressions are predefined entities configured to perform actions involving the system. The system initiates the expression engine. The system executes an initial expression upon initial data to produce an expression result. Executing the initial expression can involve iteratively resolving an ordered set of related expressions.

20 Claims, 4 Drawing Sheets

(56) References Cited

U.S. PATENT DOCUMENTS

| | | |
|---|---|---|
| 2006/0059253 A1 | 3/2006 | Goodman et al. |
| 2008/0127101 A1 | 5/2008 | Anafi et al. |
| 2011/0131451 A1 | 6/2011 | Bosch |
| 2014/0067567 A1 | 3/2014 | Cooke et al. |
| 2014/0095938 A1 | 4/2014 | Eljuse |
| 2014/0180961 A1 | 6/2014 | Hankins et al. |
| 2014/0310392 A1* | 10/2014 | Ho .................. H04L 67/02 709/223 |
| 2015/0039587 A1 | 2/2015 | Liu et al. |
| 2015/0039941 A1 | 2/2015 | Kalyanasundram |
| 2016/0379181 A1 | 12/2016 | Nordlof et al. |
| 2018/0157466 A1 | 6/2018 | Jubran et al. |
| 2019/0394291 A1 | 12/2019 | Kondamuri et al. |
| 2020/0159653 A1 | 5/2020 | Raghupathy et al. |
| 2020/0286076 A1 | 9/2020 | Zhu et al. |

OTHER PUBLICATIONS

United States Office Action, U.S. Appl. No. 16/893,209, dated Sep. 8, 2022, 27 pages.
United States Office Action, U.S. Appl. No. 16/893,209, dated Feb. 9, 2023, 26 pages.

* cited by examiner

EXPRESSION ENGINE FOR TESTING TRANSACTION PROCESSING SYSTEM

CROSS-REFERENCE TO RELATED APPLICATIONS

This application is a continuation of U.S. patent application Ser. No. 17/390,350, filed Jul. 30, 2021, which issued as U.S. Pat. No. 11,379,258, granted Jul. 5, 2022.

BACKGROUND

Technical Field

The subject matter described relates generally to configuration testing and, in particular, to a platform for testing a transaction orchestrator.

Background Information

Existing approaches to validating a transaction orchestrator (e.g., a banking stack) are siloed, with different approaches being used for different parts of the transaction orchestrator (e.g., different parts of the banking stack, different systems or subsystems, or so on). This often results in multiple copies of the same or similar data being stored which may be hard to reconcile over time. Many existing approaches also rely on extensive manual review, which is prone to human error. These and other factors increase the risk that an incorrectly configured transaction orchestrator is deployed, which can cause delayed transaction processing time, or even cybersecurity risks, privileged data leakage, faulty records, and other such issues.

Furthermore, when parts of the transaction orchestrator are updating, creating corresponding validation approaches may be difficult and time consuming. This may result in delay in the roll out of improved transaction processing systems. Thus, there is a need for systems and methods for validating transaction orchestrators that can be holistic, reliable, and secure, and that may also be extended or modified with little or no friction. Often, validating transactions can involve application programming interface (API) interactions with various systems according to pre-created software, and may be prompted by user input (e.g., a user submitting a transaction).

SUMMARY

A system receives a request to process data, e.g., constructing an API payload, sending an API request to an API endpoint at a remote system, or processing an API response. The system processes the data using an expression engine to apply one or more expressions to the data to be processed. Expressions are predefined entities configured to perform actions involving the system. Processing the data using expressions may include applying one or more expressions to intermediate data retrieved or received during the processing, such as data received in an API response from a remote system in response to an API request sent by the system using an API payload constructed using the expression engine. Processing the data can include executing an initial expression. Executing the initial expression can involve iteratively or recursively resolving an ordered set of related expressions, e.g., expressions nested within the initial expression. Various systems may employ an expression engine for a variety of purposes, such as validating transactions.

In an embodiment, a validation system uses an orchestration engine to evaluate test cases to validate a transaction orchestrator (e.g., a banking stack). A test case includes a transaction (e.g., a payment from one account to another) along with a primary transaction expression and a validation transaction expression. A transaction expression is a predefined entity configured to perform one or more actions involving the transaction orchestrator. The validation system provides the transaction to the transaction orchestrator and receives output. The validation system executes the primary transaction expression upon the received output to produce an expression result. This can involve parsing the primary transaction expression to construct an ordered set of secondary transaction expressions to resolve, then iteratively resolving the ordered set of related transaction expressions. The validation system evaluates the expression result using the validation transaction expression, then validates the transaction orchestrator based on the evaluation.

For example, a test case might include sending a payment with an invalid IBAN (international bank account number) to validate that the payment orchestrator rejects invalid accounts. In various embodiments, the validation system separates the creation of transaction expressions, an engineering concern, from the creation of test cases, a user concern. This separation may be useful because it releases the user from the task of learning technical language to be able to create test cases. In other words, the test case creation becomes something the user can conduct in a self-service fashion without need for technical assistance. Another benefit of this approach is that the user may be isolated from technology changes. Thus, at any point in time, the engineering team can enhance the transaction expressions in a way that is entirely transparent for the user. New transaction expressions may be added and made available to users with the addition of configuration data in a database or other datastore used by the validation system. In an embodiment, once the data is added, new UI components are automatically displayed to allow users to select the new transaction expression and include it in test cases.

The functionality of the validation system may be significantly data driven. Changes or additions to transaction expressions can be performed through database commands, without writing or altering code. This can allow for a change in behavior without requiring redeployment. Each part of the definition of a transaction expression can be unit tested. Transaction expressions may be chained together to form complex transaction expressions that can model a sequence of actions, such as imitating user interactions with the transaction orchestrator, interacting with various internal and external systems, constructing data objects, and validating data from the transaction orchestrator. One of skill in the art may appreciate other advantages to the techniques described herein.

In one embodiment, a method for testing a transaction orchestrator includes receiving a request to test the transaction orchestrator that identifies a test case. The test case identifies a transaction, a primary transaction expression, and a validation transaction expression. The transactions are provided to the transaction orchestrator for processing and the output from the transaction orchestrator is received in response. The primary transaction expression is executed upon the received output, which involves parsing the primary transaction expression to construct an ordered set of secondary transaction expressions to resolve and then iteratively resolving the ordered set of secondary transaction expressions. Responsive to completing the iterative resolution of the ordered set of secondary transaction expressions, an expression result is outputted. The expression result is evaluated by execution of the validation transaction expression upon the expression result, and the transaction orchestrator is validated based on the evaluation.

In an embodiment, a non-transitory computer-readable storage medium stores computer program instructions executable by at least one processor to perform operations such as the above method. In an embodiment, a system includes a test case module, an orchestration engine, and a transaction expression engine that performs operations such as the above method. The system may comprise a non-transitory computer-readable storage medium and at least one processor.

According to the techniques described herein, an expression engine enables API interactions in a dynamic, data-driven manner, without needing pre-created software.

DETAILED DESCRIPTION

Reference will now be made to several embodiments, examples of which are illustrated in the accompanying figures. Wherever practicable, similar or like reference numbers are used in the figures to indicate similar or like functionality. Although specific embodiments of a system and method for validating a transaction orchestrator are described, one of skill in the art will recognize that the disclosed techniques may be applied in other ways and for validation of different types of software applications.

System Environment

Various systems may employ an expression engine for a variety of purposes. Various embodiments of a system for validating transactions using an expression engine are described herein. However, a person having ordinary skill in the art will recognize that the techniques described may be applied to alternative systems and processes without departing from the principles set forth herein.

Figure 1:
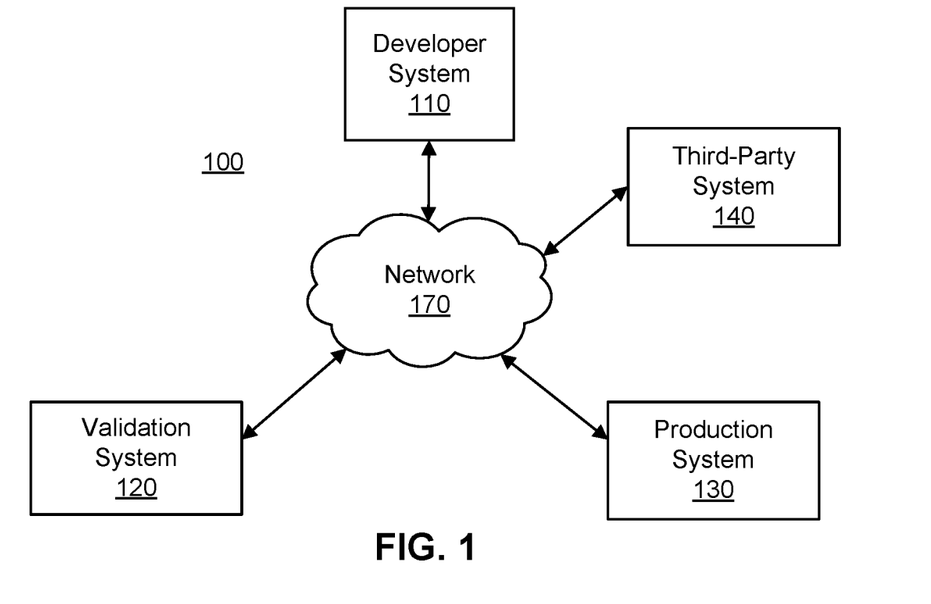
FIG. 1 is a block diagram of a networked computing environment suitable for validating a transaction orchestrator, according to one embodiment.

FIG. 1 illustrates one embodiment of a networked computing environment 100 suitable for developing, validating, and deploying a transaction orchestrator. In the embodiment shown, the networked computing environment 100 includes a developer system 110, a validation system 120, a production system 130, and a third-party system 140, all connected via a network 170. In other embodiments, the networked computing environment 100 may include different or additional elements. For example, the networked computing environment 100 may not include any third-party systems 140 or may include multiple third-party systems 140. Furthermore, the functionality may be distributed in a different manner than described. For example, the functionality attributed to the developer system 110 and validation system 120 may be provided by a single computing device.

The developer system 110 is one or more computing devices with which a development team designs and builds a transaction orchestrator for an organization. The transaction orchestrator is configured to process transactions. Typically, the transaction orchestrator performs multiple steps in a specified order to process a transaction. Each step outputs results and the results of at least some of the steps determine whether the transaction should be approved or denied. For example, one step may check that the parties to the transaction are not subject to sanctions that should result in the transaction being denied. Another step may verify that the payor has sufficient funds available to complete the transaction, etc. As regulations, business goals, user demands, available technology, best practices, and other factors evolve, the development team will typically update the transaction orchestrator to meet the organization's demands.

The validation system 120 is one or more computing systems configured to test the transaction orchestrator to determine whether it meets one or more requirements, such as expected results. In various embodiments, the validation system 120 enables a user to define a test case including one or more transaction expressions and one or more test transactions. A transaction expression is a predefined entity configured to perform one or more actions involving the transaction orchestrator. In an embodiment, a transaction expression includes one or more of an expression input, an expression description, an expression type, and an expression context. The expression input can include input data and/or a secondary transaction expression, or may be empty, i.e., include no input. The expression description includes a definition of the transaction expression. The expression type identifies a type of transaction expression. The expression context includes context data and/or one or more transaction expressions (e.g., references to other transaction expressions).

The validation system 120 processes and validates the test transactions against the transaction orchestrator using the transaction expressions and determines whether the resulting output is valid. The validation system 120 may present results to the user, who can decide whether to certify the transaction orchestrator as ready for production, perform additional tests, or send it back the development team for additional development. In some embodiments, if the validation system 120 determines there are no issues to resolve, the transaction orchestrator may be automatically certified and/or put in production. Various embodiments of the validation system 120 are described in greater detail below with reference to FIG. 2.

Once the transaction orchestrator is certified as ready for production, it may be provided to the production system 130. The production system 130 includes one or more computers that process actual transactions using the transaction orchestrator. For example, the production system 130 may be a transaction orchestrator operated by a bank or other financial institution. The newly certified transaction orchestrator may be used to supplement or replace the existing transaction orchestrator on the production system 130 (or, in the case of a new or previously disabled system, bring it online). A transaction orchestrator tested by the validation system 120 may be a copy of some or all of the transaction orchestrator running on production system 130, or may be an alternative version of some or all of the transaction orchestrator running on the production system 130, depending upon the embodiment.

The third-party system 140 is one or more computing systems affiliated with a third-party organization unrelated to the developer system 110, validation system 120, or production system 130. For example, the third-party system 140 may host a software application affiliated with one bank whereas the developer system 110, validation system 120, and production system 130 are affiliated with another bank. In some embodiments, the third-party system 140 provides an application programming interface (API) with which entities may interact with the software application hosted by the third-party system 140. For example, the API may expose an endpoint to which a request including a payload may be sent, and the software application responds with an API response. The payload is data included in the request, and, in one embodiment, is formatted using JavaScript Object Notation (JSON). Additionally or alternatively, the validation system 120 may communicate with the third-party system 140 alternatively or additionally using one or more alternative techniques, such as message buses (e.g., APACHE KAFKA, APACHE ACTIVE MQ, IBM MQ) and file systems (e.g., AWS S3). In such embodiments, the transaction expression engine may construct messages according to the standards of the employed techniques and may similarly receive respective responses.

Although described herein with reference to a third-party system 140, the described techniques can similarly be applied to internal systems affiliated with the same organization as the developer system 110, validation system 120, and production system 130, such as a secondary system of the transaction orchestrator siloed from the transaction orchestrator itself.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). All or some of the communication links of the network 170 may be encrypted using any suitable technique or techniques.

Figure 2:
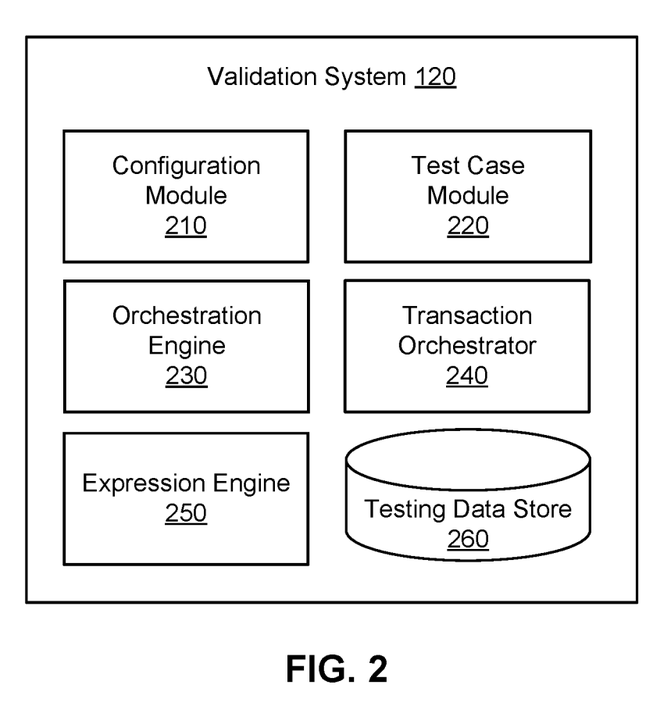
FIG. 2 is a block diagram of the validation system of FIG. 1, according to one embodiment.

FIG. 2 illustrates one embodiment of the validation system 120. In the embodiment shown, the validation system 120 includes a configuration module 210, a test case module 220, an orchestration engine 230, a transaction orchestrator 240, an expression engine 250, and a testing datastore 260. In other embodiments, the validation system 120 may include different or additional elements. Furthermore, the functionality may be distributed in a different manner than described. For example, although the transaction orchestrator 240 is shown for illustrative purposes as part of the validation system 120, it may be a separate computing system that communicates with the validation system via the network 170.

The configuration module 210 enables an engineering team to define and configure transaction expressions for validating business flows. Engineering team is used broadly in this context to refer to one or more people responsible for encoding the business flows into transaction expressions. In one embodiment, the engineering team sources the business flows to be validated from users of the transaction orchestrator 240 and defines a set of steps or processes for validating the business flows, with each step or process being an expression with which the performance of the transaction orchestrator may be tested to determine whether it passes of fails the requirements of the test. Transaction expressions are described in further detail below with reference to FIG. 3, which illustrates an embodiment of the expression engine 250. The expression engine 250 executes transaction expressions.

In an embodiment, the configuration module 210 additionally enables the engineering team to define and configure assertions for validating business flows. Assertions are queries, such as JSON path queries, that are run against output from the transaction orchestrator 240. The assertions may be written in one language and translated into executable queries (e.g., in a JSON query language) and stored in the testing data store 260. A test case may include one or more assertions, whether preconfigured to include the assertions or selected by a user. The orchestration engine 230 retrieves the assertions selected for the test case from the testing data store 260 and builds a query set for the test case case (e.g., the JSON query generated from each selected assertion). In another embodiment, definitions of the assertions may be stored in another format (e.g., in the testing datastore 260) and the orchestration engine 230 may build the queries from the stored definitions of the assertions.

Regardless of exactly how the set of queries is obtained, the orchestration engine 230 applies the queries to the output of the transaction orchestrator 240. Each query identifies a string or value (or set of strings or values) that are expected to be in the output from the transaction orchestrator 240 if the transaction orchestrator is processing the test payments correctly. If the identified string or value for a given assertion is found in the output, the orchestration engine 230 marks that assertion as passed. Thus, the orchestration engine 230 may determine whether the transaction orchestrator 240 passes or fails each assertion. The orchestration engine 230 may store the results in the testing data store 260 (e.g., as a list of assertions applied and an indication of whether each was passed or failed).

Thus, after an initial configuration phase involving the engineering team, the users may apply the stored assertions to validate the configuration of a transaction orchestrator without further involvement of the engineering team. Additionally or alternatively, the engineering team may define or configure assertions on a periodic or on-going basis. In an embodiment, assertions may be transaction expressions configured to validate output from the transaction orchestrator 240, as detailed below.

The test case module 220 enables users to define test cases with which to test the transaction orchestrator. A test case may include one or more test transactions and one or more transaction expressions, and may additionally include one or more assertions; the assertions each may or may not include one or more transaction expressions. In one embodiment, the test case module 220 provides a user interface (UI) with which the user can create and edit test cases by selecting test transactions, transaction expressions, and/or assertions. The transaction expressions and/or assertions may be selected from those stored in the testing data store 260. The test transactions may identify a payor, a payee, an amount, a currency, and any other suitable data for a transaction conducted via the transaction orchestrator 240. Although the term test transaction is used for convenience, one of skill in the art will recognize that other types of test data may be processed by a software application and similar techniques used to validate that the test data are being processed as desired by the software application.

The orchestration engine 230 orchestrates the execution of a test case. The orchestration engine 230 retrieves data, expressions, and/or assertions from the testing data store 260 according to the specifications of the test case. The orchestration engine 230 applies test transactions to the transaction orchestrator 240 and receives results from the transaction orchestrator 240. The orchestration engine 230 initiates execution of one or more expressions and/or assertions as specified by the test case. In an embodiment, the orchestration engine 230 provides an interface between executions and/or assertions and the transaction orchestrator 240.

In one embodiment, the orchestration engine 230 displays the results of a test case to the user in a UI. The user may validate the results (e.g., by checking that portions of the transaction orchestrator output represent desirable behavior of the transaction orchestrator rather than coincidence). If the user determines that all of the tests were passed and sufficient testing has occurred, the user may validate the transaction orchestrator and it can be released to the production system 130 for deployment. Alternatively, the user may execute additional test cases against the transaction orchestrator to gather further data or elect to send the transaction orchestrator back to the responsible technology team for further work. For example, if the transaction orchestrator is failing particular test case because it is not processing transactions correctly, the user can flag the error and request the appropriate technology team fix it. Once an updated version of the transaction orchestrator is provided by the development team, the user may test it again. This process may be repeated until the user is satisfied that the transaction orchestrator is ready for deployment.

In some embodiments, once a test case has been defined, it is saved (e.g., in the testing data store 260). Thus, rather than defining a new test case every time a transaction orchestrator is tested, user may load previously defined test cases and execute them as many times as desired. Furthermore, users may load test cases and then edit them to create new test cases. Because the process of creating test cases involves defining test transactions and selecting premade transaction expressions and/or assertions, it may be performed by users without the need to further engage with the engineering team. In embodiments where the test cases are stored, the user may efficiently retest the updated transaction orchestrator by loading and re-executing the previously used test cases.

The testing data store 260 includes one or more computer readable media configured to store data used by the validation system 120. Although shown as one element, the testing data store 260 may comprise two or more distinct data stores, e.g., two data stores that each store particular types of transaction data. Furthermore, although the testing data store 260 is shown as part of the validation system 120, some or all of the data may be stored remotely (e.g., in a distributed database) and accessed via the network 170.

Figure 3:
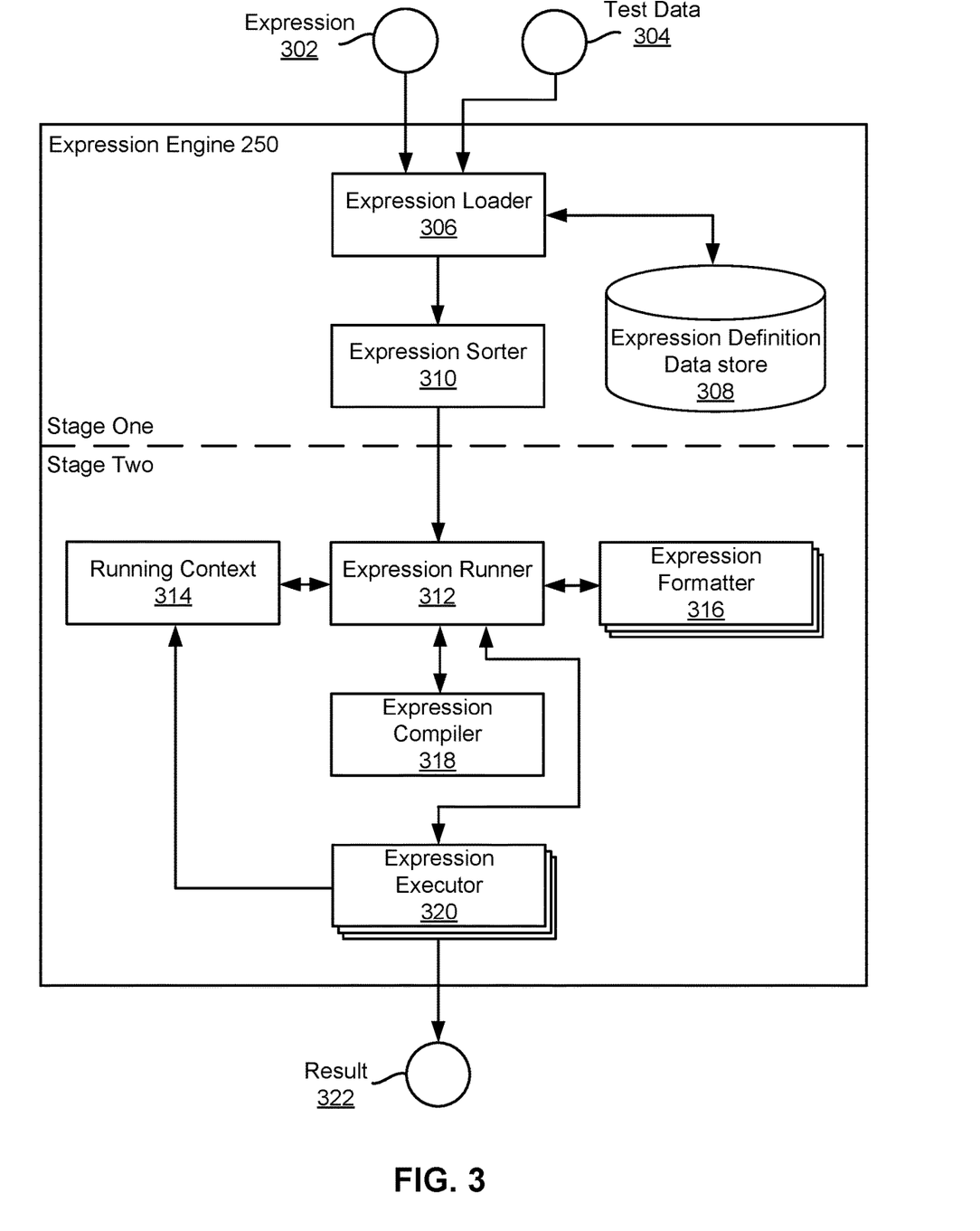
FIG. 3 illustrates an expression engine, according to one embodiment.

FIG. 3 illustrates the expression engine 250 of FIG. 2, according to one embodiment. The expression engine 250 executes transaction expressions, e.g., as part of a test case. The expression engine 250 receives as input an expression 302 and, depending upon the embodiment, test data 304. The orchestration engine 230 may initiate the expression engine 250 and/or input the expression 302 and/or test data 304 to expression engine 250. The expression 302 entered into the expression engine 250 may be considered a "primary expression" or "primary transaction expression."

The test data may be, for example, output generated by the transaction orchestrator 240 in response to a test transaction. The test data may alternatively or additionally include data included in the test case, and/or transaction expression input data, e.g., another transaction expression. Various data are described herein, and a person of skill in the art will recognize that data can have different sources or content than described herein without departing from the principles put forth herein.

In an embodiment, execution of a transaction expression by the expression engine 250 includes two general stages, a Stage One that is performed once and a Stage Two that is performed iteratively or recursively until a stopping condition, e.g., all expressions have been resolved. Stage One involves an expression loader 306, an expression definition data store 308, and an expression sorter 310. The expression definition data store 308 stores transaction expression data. Depending upon the embodiment, the expression definition data store 308 may be a component of the expression engine 250 or may be a remote entity accessed by the expression engine 250 via the network 170, and may be one data store or a distributed data store across a set of data stores.

The expression 302 and the test data 304 enter the expression engine 250 at the expression loader 306. The expression loader 306 parses the expression and retrieves from the expression definition data store 308 data associated with the expression 302, such as an expression input, an expression description, an expression type, and an expression context of the expression 302, which may include loading one or more additional transaction expressions, e.g., transaction expressions nested within the expression 302, such as at the expression context of the expression 302. This may also include loading input data related to the expression input and/or context data related to the expression context. In an embodiment, the input data and/or the context data includes a transaction expression. One or more transaction expressions nested within the expression 302, as well as transaction expressions nested within those transaction expressions, and so on, are, in combination with the expression 302 itself, cumulatively a set of transaction expressions, e.g., a set of "secondary expressions" or "secondary transaction expressions."

After loading data from the expression definition data store 308, the expression loader 306 passes on the set of transaction expressions, and in some embodiments the test data 304 and/or some or all of the loaded data, to the expression sorter 310. The expression sorter 310 sorts the set of transaction expressions into an ordered set of transaction expressions, in which order the expression engine 250 will resolve the transaction expressions in Stage Two. In some embodiments, the expression sorter 310 sorts the transaction expressions by constructing a graph of the transaction expressions. For example, each transaction expression may have a respective node and edges may be between nodes representing transaction expressions where one is included as context data by, referenced by, or included as input data to, the other. The expression sorter 310 then performs a topological sort to order the set of transactions. Alternative embodiments may employ alternative sorting algorithms.

Upon generating the ordered set of transaction expressions, the expression sorter 310 sends the ordered set to an expression runner 312 at Stage Two of the expression engine 250. Depending upon the embodiment, either the expression sorter 310 or the expression loader 306 sends the test data 304 and/or loaded data to the expression runner 312 as well.

Stage Two involves the expression runner 312, a running context 314, one or more expression formatters 316, an expression compiler 318, and one or more expression executors 320. Stage Two iteratively or recursively resolves the ordered set of transaction expressions until all transaction expressions in the ordered set are resolved, at which point the expression engine 250 produces a result 322 as output, which the expression engine 250 may send to the orchestration engine 230 and/or testing data store 260.

The expression runner 312 coordinates resolution of the ordered set of transaction expressions. For a given pass through Stage Two (i.e., for one iteration or recursion of the execution of the ordered set of transaction expressions), the expression runner 312 parses a transaction expression (e.g., for a first iteration or recursion, a first transaction expression in the ordered set). The expression runner 312 may fetch data (e.g., temporary data generated or retrieved during earlier iterations or recursions) from the running context 314 and/or format data (e.g., some or all of the temporary data and/or test data 304) using one or more expression formatters 316. The running context 314 is a data cache where data is stored during the iterative or recursive resolution of the ordered set of transaction expressions. The one or more expression formatters 316 are data formatters that convert data from one format into another, e.g., so that it may be usable for a given transaction expression. For example, one expression formatter 316 may be a JSON formatter that uses a JSON library to convert a JSON file into a JAVA object (POJO). The expression runner 312 provides the JSON formatter with a JSON file (e.g., temporary data from the running context 314) and the JSON formatter returns to the expression runner 312 a POJO based on the JSON file.

Upon retrieving and/or formatting data involved with the transaction expression being resolved, the expression runner 312 sends the transaction expression and data to the expression compiler 318. The expression compiler 318 resolves the transaction expression using the data, e.g., applies the transaction expression to the data. The expression compiler 318 sends results of resolving the transaction expression to the expression runner 312. The expression runner 312 then sends the resolved data and/or transaction expression to an expression executor 320.

The expression engine 250 includes one or more expression executors 320 that each perform one or more functions upon data received from the expression runner 312, e.g., storing the data in the running context 314, and/or performing one or more other operations involving the data. The expression type of the transaction expression identifies the expression executor 320 to which the expression runner 312 sends the data. For example, if a transaction expression has an expression type of PLAIN, the expression runner 312 sends the data to a PLAIN expression executor, which just adds the data to the running context without any further operations.

After the expression executor 320 has acted using the data from the expression compiler 318, if there is another iteration or recursion to perform (i.e., if there are one or more transaction expressions remaining in the ordered set that are yet unresolved), the expression runner 312 begins another pass through Stage Two. This loop continues until each transaction expression in the ordered set of transaction expressions are resolved, including the primary transaction expression. Upon resolution of the ordered set of transaction expressions, the expression engine 250 outputs the expression result 322. The expression result 322 may be, for example, a most recent entry in the running context 314.

The expression engine 250 can execute transaction expressions to perform a variety of actions. For example, transaction expressions can be used to model user interactions with the transaction orchestrator 240, fetch external data from external systems, fetch secondary data from secondary systems, construct data objects (e.g., JSON files), and validate the transaction orchestrator 240 by comparing transaction orchestrator output to expected output (which may itself be fetched or generated by one or more transaction expressions of a test case). By chaining various transaction expressions together, test cases can test complex, multi-step use cases of the transaction orchestrator 240.

Example Transaction Orchestrator Validation Method

Figure 4:
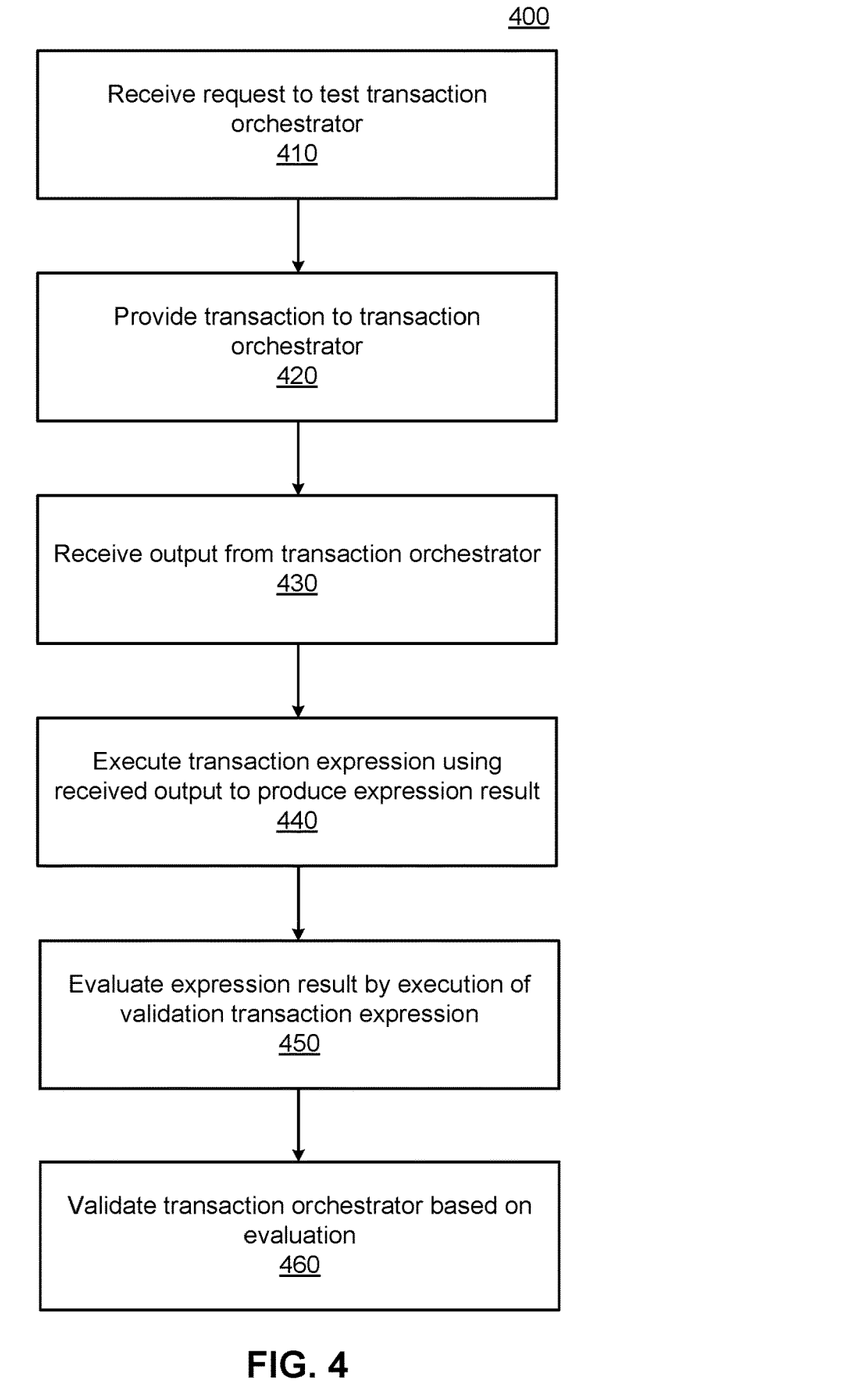
FIG. 4 is a flowchart of a method for validating a transaction orchestrator, according to one embodiment.

FIG. 4 illustrates an example method 400 for validating a transaction orchestrator. The steps of FIG. 4 are illustrated from the perspective of the validation system 120 performing the method 400. However, some or all of the steps may be performed by other entities or components. In addition, some embodiments may perform the steps in parallel, perform the steps in different orders, or perform different steps.

In the embodiment shown in FIG. 4, the method 400 begins with the validation system 120 receiving 410 a request to test the transaction orchestrator. The request identifies a test case. The test case includes one or more transactions (e.g., a test transaction), one or more transaction expressions (e.g., a primary transaction expression and a validation transaction expression). The validation system 120 provides 420 the transaction to the transaction orchestrator 240 for processing. The validation system 120 receives 430 output from the transaction orchestrator in response to the transaction.

The validation system 120 executes 440 the one or more transaction expressions using the received output to produce an expression result. In an embodiment, executing 440 the transaction expression involves parsing the primary transaction expression to construct an ordered set of secondary transaction expressions to resolve, then iteratively resolving the ordered set of secondary transaction expressions. Upon completing the iterative resolution of the ordered set of secondary transaction expressions, the validation system 120 produces the expression result.

In an embodiment, constructing the ordered set of secondary transaction expressions involves the validation system 120 resolving the expression context of the primary transaction expression to identify one or more secondary transaction expressions, then recursively resolving expression contexts of the one or more secondary transaction expressions to identify one or more additional secondary transaction expressions. The validation system 120 then constructs a transaction graph of the primary transaction expression, one or more secondary transaction expressions, and one or more additional secondary transaction expressions based on at least one of each respective expression input and expression context. The validation system 120 then applies a topological sort to the transaction graph to construct the ordered set of secondary transaction expressions, which can include the primary transaction expression (e.g., at a final position in the order).

The validation system 120 evaluates 450 the expression result by execution of the validation transaction expression. In an embodiment, the primary transaction expression and the validation transaction expression are the same transaction expression, and the evaluation 450 occurs as part of the execution 440 of the transaction expression. Based on the results of the evaluation, the validation system 120 determines whether to validate 460 the transaction orchestrator, e.g., whether to validate the transaction orchestrator as properly operational or to invalidate the transaction orchestrator as functioning improperly. In an embodiment, the validation transaction expression is at least part of an assertion. In an embodiment, the validation system 120 further evaluates the expression result using an assertion, where validating the transaction orchestrator is additionally based on the further evaluation of the expression result using the assertion. In an embodiment, the expression result is a data object.

In an embodiment, iteratively resolving the ordered set of secondary transaction expressions involves constructing an application programming interface (API) payload, sending an API request to an API endpoint of an external system or secondary system using the constructed API payload, receiving an API response comprising external system data from the external system or secondary system, and performing an operation upon the received data. The communication engine may provide an interface between the transaction expression engine and other systems, such as external systems. For example, the communication engine may send API payloads from the transaction expression engine to API endpoints, and receives API responses that the communication engine then passes to the transaction expression engine. The communication engine may be a distinct entity or be part of the orchestration engine.

In an embodiment, iteratively resolving the ordered set of secondary transaction expressions comprises imitating a user interaction with the transaction orchestrator, receiving, from the transaction orchestrator, a result of the imitated user interaction, and performing an operation upon the result of the imitated user interaction. For example, the validation system 120 may send a test payment transaction to the transaction orchestrator. The validation system 120 then uses a primary transaction expression (comprising one or more transaction expressions, e.g., a set of transaction expressions) to imitate a user interaction to release the payment. The validation system 120 then uses a validation transaction expression to validate that the transaction orchestrator properly released the payment.

Example Computing Device Architecture

Figure 5:
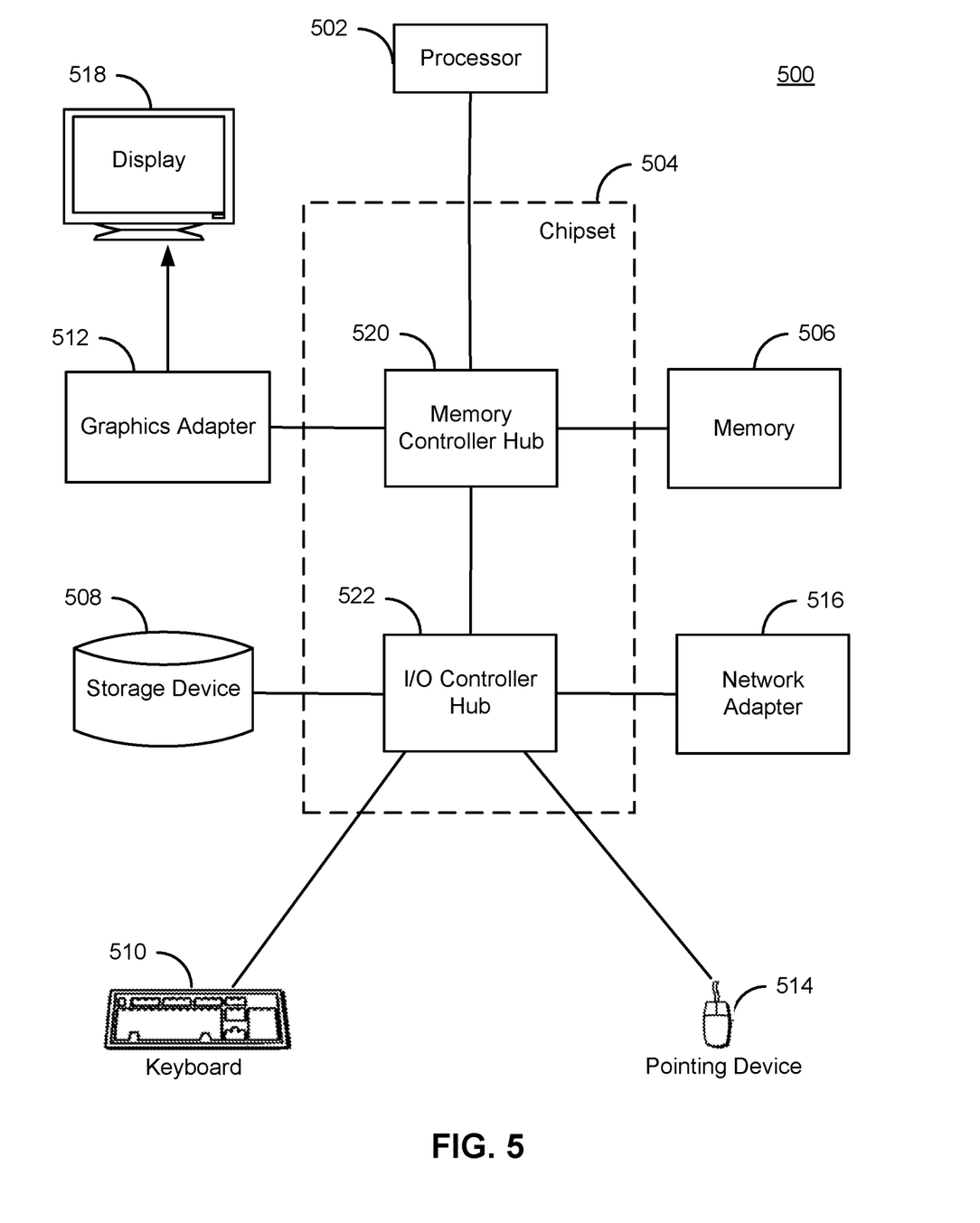
FIG. 5 is a block diagram illustrating an example computer suitable for use in the networked computing environment of FIG. 1, according to one embodiment.

FIG. 5 illustrates an example computer 500 suitable for use in the networked computing environment 100 of FIG. 1 as (or as part of) a developer system 110, a stack validation system 120, or a production system 130. The example computer 500 includes at least one processor 502 coupled to a chipset 504. For clarity, operations may be described as being performed by "a processor," but this should be understood to include multiple processors working cooperatively to perform the recited operations. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable medium such as a hard drive, compact disk read-only memory (CD-ROM), DVD, or solid-state memory device. The memory 506 holds instructions and data used by the processor 502. While the storage device 508 is shown to be a single medium, the term "machine-readable medium" should be taken to include a single medium or multiple media (e.g., a centralized or distributed database, or associated caches and servers) configured to store data or software used by the computer 500. For example, the data stores used by the stack validation system 120 may be implemented as a distributed database provided by multiple servers and accessed via the network 170.

The pointing device 514 is a mouse, track ball, touchscreen, or other type of pointing device, and is used in combination with the keyboard 510 (which may be an on-screen keyboard) to input data into the computer system 500. The graphics adapter 512 causes the display 518 to display images and other information. The network adapter 516 couples the computer system 500 to one or more computer networks, such as the internet. In some embodiments, a computer can lack some of the components described above, such as a keyboard 510, pointing device 514, or display 518.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate alternative structural and functional designs for a system and a process for validating the configuration of a transaction orchestrator. For instance, server processes may be implemented using a single server or multiple servers working in combination, databases and applications may be implemented on a single system or distributed across multiple systems, and distributed components may operate sequentially or in parallel. Thus, while particular embodiments and applications have been illustrated and described, the scope of protection should be limited only by any claims that issue.

What is claimed is:

1. A method for testing a transaction orchestrator, the method comprising:
   receiving output generated by the transaction orchestrator;
   executing a primary transaction expression using the received output to generate an expression result, comprising:
      parsing the primary transaction expression to construct one or more secondary transaction expressions; and
      iteratively resolving the one or more secondary transaction expressions to generate the expression result; and
   evaluating the expression result based on a validation transaction expression; and
   validating the transaction orchestrator based on the evaluation.

2. The method of claim 1, wherein the primary transaction expression is a predefined entity that comprises one or more of: an expression input, an expression description, an expression type, and an expression context, the expression input comprising at least one of input data and a secondary transaction expression, the expression description comprising a definition of the primary transaction expression, the expression type comprising a type of transaction expression, and the expression context comprising at least one of context data and one or more secondary transaction expressions.

3. The method of claim 2, wherein parsing the primary transaction expression comprises:
   resolving the expression context of the primary transaction expression to identify the one or more secondary transaction expressions;
   recursively resolving expression contexts of the one or more secondary transaction expressions to identify one or more additional secondary transaction expressions;
   constructing a transaction graph of the primary transaction expression, the one or more secondary transaction expressions, and one or more additional secondary transaction expressions based on at least one of each respective expression input and expression context; and
   applying a topological sort to the transaction graph to construct an ordered set of secondary transaction expressions using the one or more secondary transaction expressions and the one or more additional secondary transaction expressions.

4. The method of claim 1, wherein iteratively resolving the one or more secondary transaction expressions comprises:
   constructing an application programming interface (API) payload;
   sending an API request to an API endpoint of an external system using the constructed API payload;
   receiving, from the external system, an API response comprising external system data; and
   performing an operation upon the external system data.

5. The method of claim 1, wherein iteratively resolving the one or more secondary transaction expressions comprises:
   constructing an application programming interface (API) payload;
   sending an API request to an API endpoint of a secondary system of the transaction orchestrator using the constructed API payload;
   receiving, from the secondary system, an API response comprising secondary system data; and
   performing an operation upon the secondary system data.

6. The method of claim 1, further comprising:
   further evaluating the expression result using an assertion, wherein validating the transaction orchestrator is additionally based on the further evaluation of the expression result using the assertion.

7. The method of claim 1, wherein the validation transaction expression is at least part of an assertion.

8. The method of claim 1, wherein iteratively resolving the one or more secondary transaction expressions comprises:
   imitating a user interaction with the transaction orchestrator;
   receiving, from the transaction orchestrator, a result of the imitated user interaction; and
   performing an operation upon the result of the imitated user interaction.

9. The method of claim 1, wherein iteratively resolving the one or more secondary transaction expressions comprises:
   during at least one of the iterations, storing temporary data in a running context; and
   during at least one of the iterations, retrieving data from the running context when resolving a particular secondary transaction expression from the one or more secondary transaction expressions.

10. The method of claim 1, wherein the expression result is formatted according to a data formatter.

11. A non-transitory computer-readable storage medium storing computer program instructions executable by at least one processor, the instructions comprising instructions to:
   receive output generated by the transaction orchestrator;
   execute a primary transaction expression using the received output to generate an expression result, comprising instructions to:
      parse the primary transaction expression to construct one or more secondary transaction expressions; and
      iteratively resolve the one or more secondary transaction expressions to generate the expression result; and
   evaluate the expression result based on a validation transaction expression; and
   validate the transaction orchestrator based on the evaluation.

12. The non-transitory computer-readable storage medium of claim 11, wherein instructions to parse the primary transaction expression comprise instructions to:
   resolve an expression context of the primary transaction expression to identify the one or more secondary transaction expressions;
   recursively resolve expression contexts of the one or more secondary transaction expressions to identify one or more additional secondary transaction expressions;
   construct a transaction graph of the primary transaction expression, the one or more secondary transaction expressions, and one or more additional secondary transaction expressions based on at least one of each respective expression input and expression context; and
   apply a topological sort to the transaction graph to construct an ordered set of secondary transaction expressions using the one or more secondary transaction expressions and the one or more additional secondary transaction expressions.

13. The non-transitory computer-readable storage medium of claim 11, wherein instructions to iteratively resolve the one or more secondary transaction expressions comprise instructions to:
construct an application programming interface (API) payload;
send an API request to an API endpoint of an external system using the constructed API payload;
receive, from the external system, an API response comprising external system data; and
perform an operation upon the external system data.

14. The non-transitory computer-readable storage medium of claim 11, wherein instructions to iteratively resolve the one or more secondary transaction expressions comprise instructions to:
construct an application programming interface (API) payload;
send an API request to an API endpoint of a secondary system of the transaction orchestrator using the constructed API payload;
receive, from the secondary system, an API response comprising secondary system data; and
perform an operation upon the secondary system data.

15. The non-transitory computer-readable storage medium of claim 11, the instructions further comprising instructions to:
further evaluate the expression result using an assertion, wherein validating the transaction orchestrator is additionally based on the further evaluation of the expression result using the assertion.

16. The non-transitory computer-readable storage medium of claim 11, wherein instructions to iteratively resolve the one or more secondary transaction expressions comprise instructions to:
imitate a user interaction with the transaction orchestrator;
receive, from the transaction orchestrator, a result of the imitated user interaction; and
perform an operation upon the result of the imitated user interaction.

17. The non-transitory computer-readable storage medium of claim 11, wherein instructions to iteratively resolve the one or more secondary transaction expressions comprise instructions to:
during at least one of the iterations, store temporary data in a running context; and
during at least one of the iterations, retrieve data from the running context when resolving a particular secondary transaction expression from the one or more secondary transaction expressions.

18. The non-transitory computer-readable storage medium of claim 11, wherein the expression result is formatted according to a data formatter.

19. A transaction orchestrator configuration validation system comprising:
a test case module comprising a test case module processor and configured to define a test case, the test case identifying a transaction, a primary transaction expression, and a validation transaction expression;
an orchestration engine comprising an orchestration engine processor and configured to:
provide the transaction to a transaction orchestrator for processing; and
receive output generated by the transaction orchestrator responsive to processing the transaction; and
a transaction expression engine comprising a transaction expression engine processor and configured to:
execute a primary transaction expression using the received output to generate an expression result, comprising instructions to:
parse the primary transaction expression to construct one or more secondary transaction expressions; and
iteratively resolve the one or more secondary transaction expressions to generate the expression result; and
evaluate the expression result based on the validation transaction expression; and
validate the transaction orchestrator based on the evaluation.

20. The transaction orchestrator configuration validation system of claim 19, wherein parsing the primary transaction expression comprises:
resolve an expression context of the primary transaction expression to identify the one or more secondary transaction expressions;
recursively resolve expression contexts of the one or more secondary transaction expressions to identify one or more additional secondary transaction expressions;
construct a transaction graph of the primary transaction expression, the one or more secondary transaction expressions, and one or more additional secondary transaction expressions based on at least one of each respective expression input and expression context; and
apply a topological sort to the transaction graph to construct an ordered set of secondary transaction expressions using the one or more secondary transaction expressions and the one or more additional secondary transaction expressions.

* * * * *

UNITED STATES PATENT AND TRADEMARK OFFICE
CERTIFICATE OF CORRECTION

PATENT NO. : 11,853,790 B2
APPLICATION NO. : 17/855033
DATED : December 26, 2023
INVENTOR(S) : Jorge Luis Perea Ramos et al.

It is certified that error appears in the above-identified patent and that said Letters Patent is hereby corrected as shown below:

In the Claims

In Column 13, Claim 1, Lines 19-20, delete "result; and" and insert -- result; --, therefor.

In Column 14, Claim 11, Lines 46-47, delete "result; and" and insert -- result; --, therefor.

Signed and Sealed this
Twenty-seventh Day of August, 2024

Katherine Kelly Vidal
*Director of the United States Patent and Trademark Office*